United States Patent [19]
Satomi

[11] 3,709,602
[45] Jan. 9, 1973

[54] OPTICAL PATH LENGTH COMPENSATION IN A COPIER

[75] Inventor: Toyokazu Satomi, Tokyo, Japan

[73] Assignee: Ricoh Co. Ltd., Tokyo, Japan

[22] Filed: Nov. 5, 1971

[21] Appl. No.: 196,014

[52] U.S. Cl. ..................... 355/49, 355/57, 355/60
[51] Int. Cl. .............................. G03b 27/70
[58] Field of Search ................... 355/49, 57, 60

[56] References Cited

UNITED STATES PATENTS

| | | | |
|---|---|---|---|
| 3,609,024 | 9/1971 | Suzuki | 355/60 X |
| 3,614,222 | 10/1971 | Post | 355/60 X |

FOREIGN PATENTS OR APPLICATIONS 795,072  9/1968  Canada ........................... 355/49

*Primary Examiner*—Samuel S. Matthews
*Attorney*—Robert Scobey et al.

[57] ABSTRACT

An original placed on a transparent flat base is scanned by a rotary reflection mirror which directs light via a focusing lens and a second reflection mirror onto a photosensitive material. The difference in light path length caused by rotational scanning of the flat original is compensated for by moving the second reflection mirror and, in some embodiments, by movement also of the focusing lens or a zoom lens.

10 Claims, 4 Drawing Figures

INVENTOR
TOYOKAZU SATOMI
BY
Henry T. Burke
ATTORNEY

OPTICAL PATH LENGTH COMPENSATION IN A COPIER

BACKGROUND OF THE INVENTION

The invention relates to the scanning of a flat original for the purpose of illuminating a photosensitive material to make a copy of the original.

Heretofore, an original has been placed on a transparent, partially cylindrical base, the center of which coincides with the center of rotation of a rotary reflection mirror. While light path length is constant for all portions on the surface of the scanned original, the use of a cylindrical base is cumbersome and prevents copying of originals which may not be so positioned.

In order to overcome this drawback, a flat base has been substituted for a cylindrical base, and the difference in light path length which is caused by rotational scan of a rotary reflection mirror is compensated for by moving the original surface up and down. The mechanism for moving the original is quite complicated and results in various inconveniences.

The present invention overcomes these drawbacks. An original surface flatly placed is fixed, and an exposure optical system is moved in unison with a rotational scan of a rotary reflection mirror to compensate for light path length variations.

DETAILED DESCRIPTION

Figure 1:
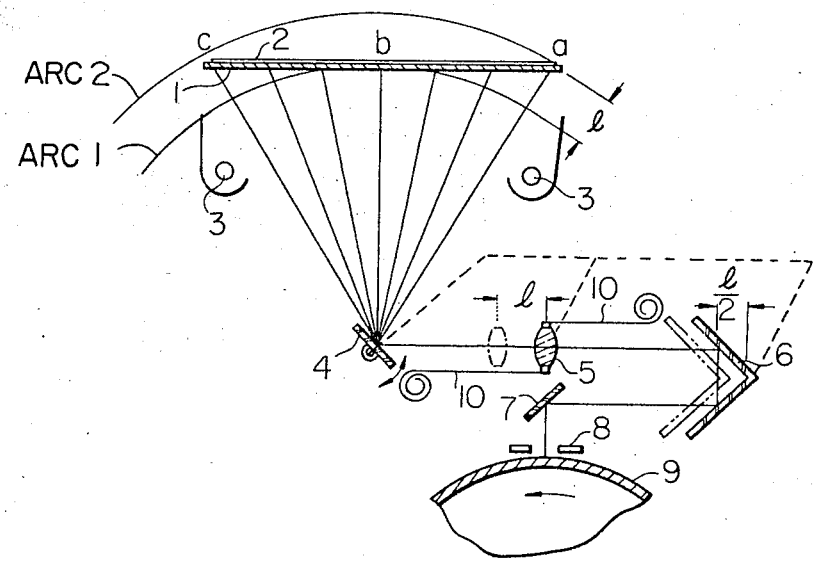
FIG. 1 is a schematic side view of an optical system embodying the present invention.

Referring to FIG. 1, the entire surface of an original 2 placed on a flat, transparent base 1 (fixed in position) is illuminated by light sources 3, and the illuminated original surface is scanned by a rotary reflection mirror 4 positioned underneath the base 1. Light is reflected by the rotary reflection mirror 4 through a focusing lens 5 onto a second reflection mirror 6 which directs the light by another reflection mirror 7 onto a photosensitive material 9 through a slit 8. The photosensitive material 9 rotates in synchronism with the rotary reflection mirror 4.

It will be noted that the distance between the center of rotation of the rotary reflection mirror 4 and various portions of the original surface varies because the original 2 is flatly placed. Considering two circular arcs, 1 and 2, arc 1 of which has a radius equal to the shortest distance between the center of rotation of the rotary reflection mirror 4 and the flat original surface and arc 2 of which has a radius equal to the longest difference between the rotary reflection mirror and the original, the difference between the radii of such arcs is designated $l$ in FIG. 1.

Analyzing the difference in reflection light path length, the difference is greatest ($l$) at scan starting position $a$ on the original surface. As the rotary reflection mirror 4 rotates, the difference gradually decreases to zero at central scan position $b$. After passing the position $b$, the difference gradually increases again to be the greatest ($l$) at scan ending position $c$ on the original surface.

The present invention eliminates the difference in reflection light path which is caused by rotation of the rotary reflection mirror 4 through movement of an exposure optical system in unison with rotation of the rotary reflection mirror.

When the distance from the rotary reflection mirror 4 to the flat original surface is greatest, (i.e., at scan starting position $a$ and at scan ending position $c$), the focusing lens 5 is positioned as shown in dotted lines. The focusing lens 5 moves a distance $l$ along the reflection light path between the mirrors 4 and 6 in unison with rotation of the reflection mirror 4. Thus, the focusing lens 5 moves to the position shown in solid lines in FIG. 1 when the distance between the rotary reflection mirror 4 and the flat original surface is shortest, (i.e., at scan position $b$). Thus, the reflection light path length from the original surface to the focusing lens 5 remains constant.

The reflection mirror 6 is moved by distance $l/2$ in unison with movement of the focusing lens 5. The V-shaped reflection mirror 6 is in the position shown in dotted lines at scan starting and ending positions $a$ and $c$, and is in the position shown in solid lines at intermediate scan position $b$. While the mirror 6 moves a distance $l/2$, the reflected light undergoes a total path length change of $l$ (due to the reflection of light from the two reflecting surfaces of mirror 6). Thus, the light path length from the original surface to the focusing lens 5 is equal to the light path length from the focusing lens 5 to the photosensitive material 9 for all positions of the reflection mirror 4, and therefore the same multiple exposures can be effected constantly.

In the embodiment of FIG. 1, the focusing lens 5 and the reflection mirror 6 are moved by distances $l$ and $l/2$ respectively in unison with rotation of the rotary reflection mirror 4 so as to compensate for the differences in light path length caused by rotational scan of the rotary reflection mirror 4. A roller blind 10 is mounted for movement of focusing lens 5 to shield the light so that the photosensitive material 9 is not illuminated by the light of the light source lamp 3.

Figure 2:
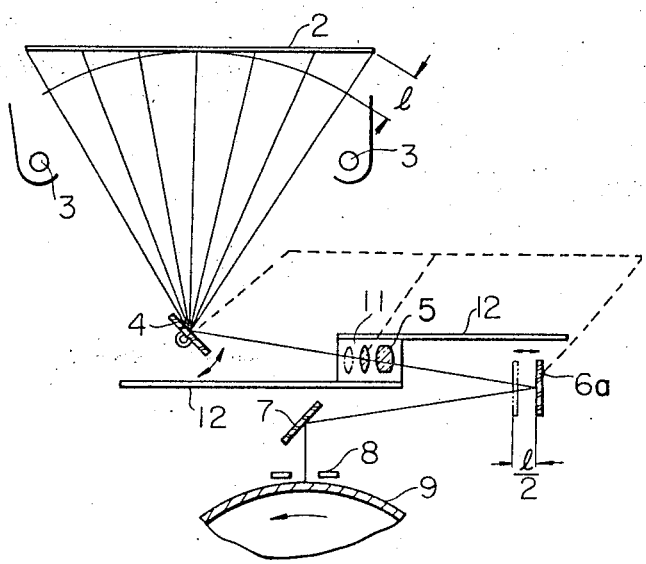
FIGS. 2–4 are schematic views of other embodiments of the present invention.

In the embodiment illustrated in FIG. 2, a zoom lens 11 is added to the focusing lens 5 to permit the position of the latter to be fixed, and the roller blind 10 is replaced by a fixed light shield plate 12. The zoom lens 11 and the reflection mirror 6a (in this case a flat mirror rather than V-shaped) are moved in unison with rotation of the rotary reflection mirror without moving a focusing lens cylinder. In this case the reflected light still undergoes a total path length change of $l$ between the fixed focusing lens 5 and the photosensitive material 9. Movement of the zoom lens compensates for the change in light path length between the rotary reflection mirror 4 and the surface of the original 2.

Figure 3:
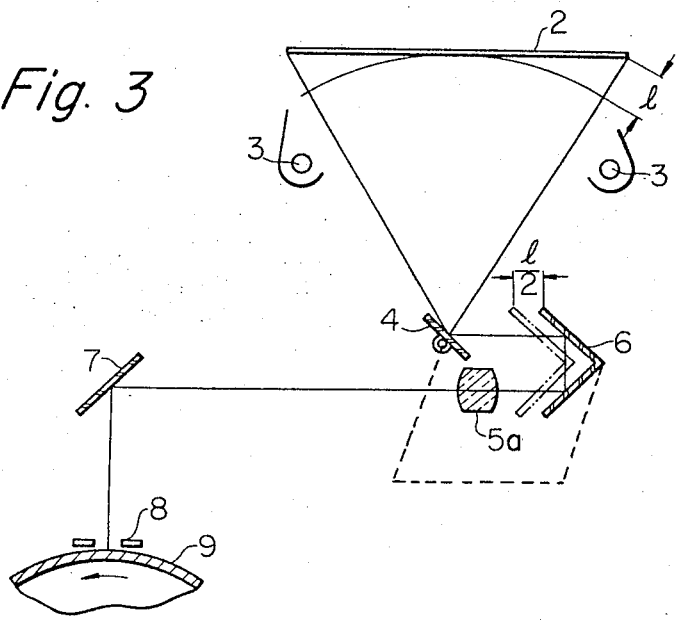
Figure 4:
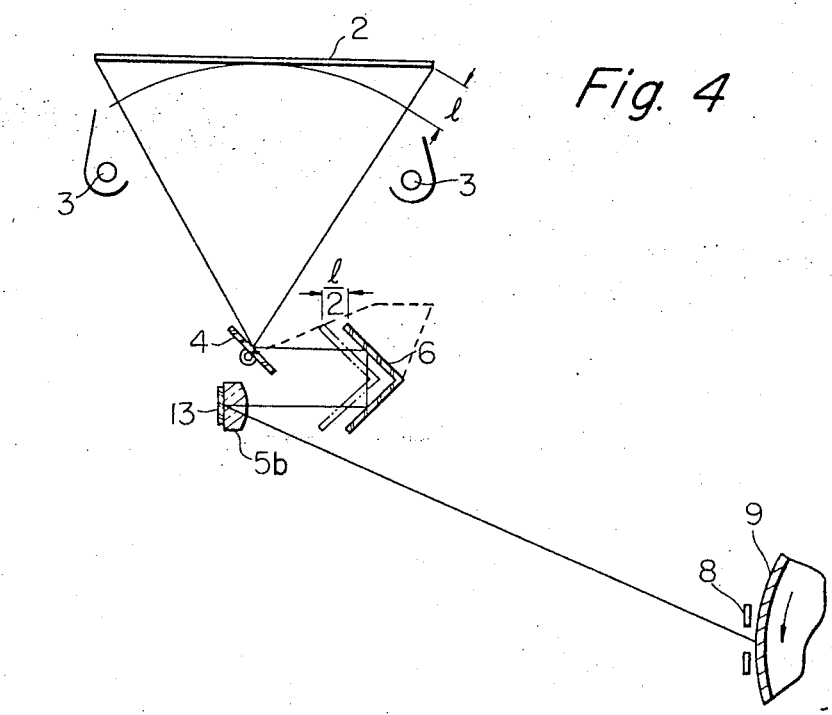

In the embodiments illustrated in FIG. 3 and FIG. 4, the focusing lens (respectively 5a and 5b) is arranged in the reflection light path from the reflection mirror 6 to the photosensitive material 9. Thus, the focusing lenses 5a and 5b may be fixed; only the reflection mirror 6 is moved by distance $l/2$ in unison with rotation of the rotary reflection mirror 4.

Reference numeral 13 in FIG. 4 denotes a reflection mirror for introducing the reflected light onto the photosensitive material 9.

In summary, according to the present invention, the distance from the flat original surface to the focusing lens and that of from the focusing lens to the photosensitive material may be kept effectively constant just by slightly moving a portion of the exposure optical system. There is thus no need for a bulky apparatus for moving a base on which an original is placed up and down.

What is claimed is:

1. In apparatus for scanning a flat original utilizing a rotary reflection mirror, and including a second reflection mirror for receiving light from said rotary reflection mirror, and reflecting it onto a photosensitive material, the improvement comprising means for reciprocating said second reflection mirror in accordance with the movement of said rotary reflection mirror to vary the distance between said second reflection mirror and said photosensitive material in accordance with the varying distance between said rotary reflection mirror and the portion of said flat original scanned thereby.

2. Apparatus according to claim 1, wherein said second reflection mirror is reciprocated substantially by a distance equal to one-half the difference between the longest distance and the shortest distance from said original surface to said rotary reflection mirror.

3. Apparatus according to claim 1, including a focusing lens for transmitting light from said rotary reflection mirror to said second reflection mirror, and means for moving said focusing lens in accordance with said varying distance between said rotary reflection mirror and the portion of said flat original scanned thereby.

4. Apparatus according to claim 3, wherein said reciprocating and moving means move said second reflection mirror and said focusing lens so that the light path between said focusing lens and the portion of said flat original that is scanned is substantially constant in length and the light path between said focusing lens and said photosensitive material is also substantially constant in length.

5. Apparatus according to claim 4, in which said light paths that are maintained substantially constant in length are substantially equal to each other.

6. Apparatus according to claim 4, in which said means for moving said focusing lens moves that lens through a distance substantially equal to the difference between the longest distance and the shortest distance from said original surface to said rotary reflection mirror.

7. Apparatus according to claim 6, in said reciprocating means moves said second reflection mirror through a distance substantially equal to one-half the distance said focusing lens is moved.

8. Apparatus according to claim 1, including a fixed focusing lens for transmitting light from said rotary reflection mirror to said second reflection mirror, a zoom lens positioned between said rotary reflection mirror and said fixed focusing lens, and means for moving said zoom lens in accordance with the varying distance between said rotary reflection mirror and the portion of said flat original scanned thereby.

9. Apparatus according to claim 1, including a focusing lens for transmitting light reflected from said second reflection mirror.

10. In apparatus for scanning a flat original fixed in position and having an exposure optical system that includes a rotary reflection mirror and a movable element for receiving light from said rotary reflection mirror and directing it onto a photosensitive material, the improvement comprising means for reciprocating said movable element in accordance with the movement of said rotary reflection mirror to render substantially constant the length of the path of light in said exposure optical system regardless of variations in distance between said rotary reflection mirror and the portion of said flat original that is scanned thereby.

* * * * *

UNITED STATES PATENT OFFICE
CERTIFICATE OF CORRECTION

Patent No. 3,709,602     Dated 9 January 1973

Inventor(s) Toyokazu Satomi

It is certified that error appears in the above-identified patent and that said Letters Patent are hereby corrected as shown below:

Correct patent by indicating that priority is based upon Japanese Application No. 128170/1970 filed 29 December 1970.

Signed and sealed this 14th day of August 1973.

(SEAL)
Attest:

EDWARD M. FLETCHER, JR.
Attesting Officer

RENE D. TEGTMEYER
Acting Commissioner of Patents